Patented May 14, 1935

2,000,937

UNITED STATES PATENT OFFICE 2,000,937

COMPOSITE REACTION PRODUCT

Carleton Ellis, Montclair, N. J., assignor to Ellis-Foster Company, a corporation of New Jersey No Drawing. Application August 17, 1927,
Serial No. 213,695

10 Claims. (Cl. 260—8)

This invention relates to a natural and synthetic resin composite and to the process of making same and relates particularly to balsam and resin composites made by reacting on a natural resin, preferably of the copal type, with a resinifying or resinified composition comprising hydroxylated bodies and organic acids or their products of reaction.

As the natural resin component or resin of the copal type I preferably employ such resins as kauri, pontianac, Congo, manilla, and the like, with or without a softer natural resin such as rosin as a fluxing agent.

As a hydroxylated body I preferably employ the polyhydric alcohols such as glycols or glycerol.

In my copending application Serial No. 609,134, filed December 26, 1922, Patent No. 1,722,566, I have disclosed a resin made by reacting 75 parts by weight Congo resin, 50 parts phthalic acid and 35 parts glycerol at a gradually increasing temperature.

Thus one composite resin may be made by heating in the above manner 250 parts by weight cracked Congo resin, 123 parts by weight phthalic anhydride, 250 parts by weight rosin and 115 parts of weight glycerol.

Resins of the copal type are of a generally acid character on which their reactivity largely depends. If aldehydic or ketonic groups are present, these (especially the former) may also play a part in the reaction forming the resinous complex.

Since, from the commercial standpoint, Congo resin is perhaps the most readily available hard resin of the copal type, the illustrations given herein comprise it, but such illustrative use does not confine my invention narrowly thereto, since I include all of the several (preferably hard) species of resins of this general character.

Most of the members of this group are not readily soluble in various varnish or lacquer solvents and therefore prior to carrying out the resinifying reaction, the natural resin may be heat-treated by cracking to distil off ten to twenty-five per cent of the resin.

By so doing, I have found that a more soluble final resin composite is secured; that is, the reaction product of the subsequent synthesis using cracked Congo is more soluble than when uncracked Congo is employed.

Ordinarily I heat the natural resin in a kettle until a twenty per cent loss in weight occurs. Usually there is a drop in the acid number by such treatment. This change, however, is not sufficient to destroy the reactivity of the cracked resin. Thus, for example, a grade of Congo resin possessing an acid number of 140 to 150, will, after cracking with twenty per cent loss, exhibit an acid number of about 80. Nevertheless, this cracked resin when heated with the other raw materials of the synthesis enters into the reaction as shown by the low acid numbers found in the preferred form of resulting resin composite.

In the following example cracked Congo resin and ordinary rosin are employed in conjunction.

1

| | |
|---|---|
| Cracked Congo (acid No. 78.9) | 250 |
| W. W. (water white) rosin | 250 |
| Phthalic anhydride | 123 |
| Glycerol | 115 |

The proportions given are parts by weight. This mixture was heated gradually to 290° C. and held at that temperature for 3 hours. The resulting resin composite was hard with an acid number of 12.3. The softening point as measured by the A. S. T. M. ball and ring test is 98° C. The product is soluble in a mixture of butyl acetate 40 volumes, butyl alcohol 20 volumes, toluol 40 volumes, and in various other lacquer solvent mixtures.

2

| | Parts |
|---|---|
| Cracked Congo (acid No. 78.9) | 250 |
| W. W. (water white) rosin | 250 |
| Phthalic anhydride | 123 |
| Ethylene glycol | 120 |

This mixture was heated in a partially closed vessel equipped with an air-cooled reflux condenser and mechanical agitation was employed. The temperature was taken to 290° C. and held several hours until a hard resin was obtained. The resin had an acid number of 4 and was freely soluble in a mixture of equal volumes butyl acetate and toluol and in various other lacquer solvents.

In the foregoing two examples the rosin may be modified in proportion or replaced by equivalent substances, or even omitted entirely. In the latter case the proportion of Congo resin should be increased. Rosin is a desirable assistant of reaction and the final resin composite in solution tends to have a viscosity considerably lower than the composites made with the aid of higher fatty acids, subsequently described.

To obtain a composite of higher softening point than results with the use of ordinary rosin, I may employ oxidized rosin, made by exposing rosin in the powdered state to air at 38 to 50° C. for several days, the temperature gradually advancing during this period from the lower to the higher temperature. The rosin may contain, or be in contact with a catalyst of oxidation such as lead or manganese, during such treatment. The oxy-rosin thus obtained has a melting point considerably greater than the original resin and furthermore is notably reactive.

Oxy-rosin may be substituted in the foregoing formulas in lieu of ordinary rosin, to afford resin composites of differing properties.

The foregoing formulas illustrate resin composites made with (a) Glycerol
(b) Glycol Composites likewise may be made with mixtures of glycerol and glycol, e. g., ethylene or propylene glycol.

Polyglycerols alone or with glycerol or glycol likewise may be employed in some cases.

Glycol ethers are especially advantageous when the reaction is to be advanced to a high degree and yet retain solubility.

Dihydroxy diethyl ether and dihydroxy triethyl diether (sometimes erroneously called diethylene glycol and triethylene glycol respectively) are examples of such raw materials.

All of the above hydroxy compounds fall within the class denominated as polyhydric alcohols and this term, as used herein and in the claims, is meant to cover all of such compounds.

3

| | Parts |
|---|---|
| Cracked Congo | 50 |
| Distilled cottonseed fatty acids | 90 |
| Phthalic anhydride | 148 |
| Glycerol | 74 |
| Dihydroxy diethyl ether | 15 |

This mixture of raw materials was heated gradually to 290° C. and was held at that point for about 1 hour. A soft resin soluble in toluol, acid number 24.5 resulted.

The proportions of the hydroxylated ether may be varied and in some cases the glycerol may be omitted entirely. The ether resins have properties different from the glycerol or polyglycerol resins.

In lieu of the fatty acids of cottonseed oil I may employ those of cocoanut, peanut, lard, tallow, fish, corn, soya bean, perilla, linseed and other non-drying, semi-drying and drying oils, also the oily glycerides themselves in some cases, e. g., when the hydroxylated ethers are used. Blown oils such as blown rape or castor oils likewise may be utilized.

While I have used phthalic anhydride as an illustration in the foregoing, because of its ready availability, low cost and useful reactivity, it should be understood that I may employ various other organic acids, (or their anhydrides) preferably of the crystalline type preferably containing up to ten or 12 carbon atoms, including succinic, tartaric, citric, maleic, fumaric, malic, pyruvic, benzoic, salicylic, diphenic, terephthalic and similar resinifying acids in conjunction with resinifying glycols, hydroxylated ethers, glycerol, polyglycerol, and the like. Non-crystalline acids such as lactic acid or anhydride may be used in some cases. Hydroxy butyric acid and other hydroxy acids, aldehyde acids and so forth, falling within the resinifying group likewise are utilizable.

Ordinarily, in making the resin composite, I prefer to crack the copal, e. g., Congo, and while molten I may admix the other components and heat as may be required to carry out the reaction. Or the cracked resin may be cooled and admixed with the other components. Or the latter may first be reacted to any desired stage by appropriate heating and the cracked resin then added, heating being continued as required.

When solubility is not a requisite, e. g., in making molding compositions, the uncracked copal may be used in some cases.

4

| | Parts |
|---|---|
| Manilla copal (uncracked) | 150 |
| Phthalic anhydride | 148 |
| Diethyl glycol | 132 |

This mixture was heated slowly to 290° C. in a partially closed vessel, using mechanical agitation. Much foaming occurred. This may be largely eliminated if the manilla copal be fused prior to admixture with the other ingredients. The product obtained was of the same color as a dark grade of rosin and was somewhat soft. Much harder products are obtained when glycerol is employed as the esterifying agent.

The invention thus embraces a composite (resin, balsam or other reaction or condensation product) which composite preferably is prepared from a natural, hard resin, a non-resin, organic acid and a hydroxy body; a cracked, natural, hard resin such as cracked Congo preferably being used, with or without a natural, glyceride-oil fatty acid, such as the fatty acids of cottonseed oil; the non-resin acid preferably being a dibasic acid of a crystalline nature such as phthalic anyhdride but including in some cases liquid or non-crystalline organic acids. The term non-resin, organic acid does not embrace mineral acids such as sulphuric or phosphoric, although these or other mineral acids may be used in some cases in small proportion to accelerate or modify the reaction; thus catalytic or larger proportions may be used in some cases.

With the composite there may be blended various compatible solid substances such as nitrocellulose, cellulose acetate, cellulose ethers and other organic-solvent-soluble cellulose compounds. Other resins, pitches, tars, waxes, liquid solvents, camphor, triphenyl and tricresyl phosphate, various oils and the like may be incorporated.

Illustrations of compositions containing nitrocellulose are the following:

A clear lacquer suitable for use on pianos and other expensive wood articles may comprise:

| | |
|---|---|
| Congo rosin phthalic glyceride resinous complex #1 | 12 oz. |
| ½-second viscosity nitrocellulose | 8 oz. |
| Dibutyl phthalate | 4 oz. |
| Cottonseed phthalic glyceride resinous complex | 10 oz. |
| Butyl acetate | 54 fluid oz. |
| Butyl alcohol | 20 fluid oz. |
| Toluol | 54 fluid oz. |

The cottonseed phthalic glyceride resin employed in this formula may be made by heating a mixture of 50 parts by weight "dynamite grade" glycerol, 80 parts of phthalic anhydride and 45 parts distilled fatty acids of cottonseed oil. The mixture should be heated in a partially closed aluminum kettle with an air cooled reflux, the temperature being carried to 475° F. and holding at that temperature until a sample shows a ball and ring softening point of approximately 62° C. and an acid number of less than 25. A cheaper wood lacquer may comprise:

| | |
|---|---|
| Congo rosin phthalic glyceride resinous complex #1 | 8 oz. |
| 4-second viscosity nitrocellulose | 4 oz. |
| Tricresyl phosphate | 3 oz. |
| Ethyl acetate | 30 fluid oz. |
| Butyl acetate | 30 fluid oz. |
| Toluol | 68 fluid oz. |

A pale green brushing lacquer may comprise:

| | Parts by weight |
|---|---|
| Titanium oxide | 15 |
| Chrome green medium | 1 |
| Soft resin #2 | 8 |
| Hard resin #1 | 7 |
| Low viscosity nitrocellulose | 6 |
| Mono ethyl ether of ethylene glycol | 30 |
| Xylol | 50 |

Various other pigments or dyes may be used to obtain other colors as desired.

The composite is well adapted to be blended with nitrocellulose because of its compatibility therewith and because various forms of the composite are readily soluble in mutual or common solvents, being for example soluble in a nitrocellulose vehicle comprising a substantial proportion of a solvent of the type of the mono ethyl ether of ethylene glycol (e. g. methyl) and the several other lower ethers of ethylene and propylene glycol or mixtures of these.

The composite is especially well adapted for use with nitrocellulose of 1 or 2 seconds up to 10 or 15 second-viscosity. It may, as indicated by one of the preceding formulæ, be used with nitrocellulose of still lower viscosity (e. g. ½-second), but in the preferred composition is employed with nitrocellulose of a viscosity of an intermediate low type (e. g. 4-second). The liquid coating composition is described above containing for example nitrocellulose of about 4-second viscosity may be obtained as films or sheets, discrete or attached to supporting surfaces as desired.

The term "cracked" as applied to the natural resins is meant to describe the natural resins whose characteristics have been altered by any of the various heat treatments described herein.

What I claim is:—

1. A resinous complex consisting of the reaction products of Congo resin, ordinary rosin, phthalic anhydride and glycerol, in combining proportions.

2. A resinous complex consisting of the reaction products of Congo resin, an organic carboxylic acid, and a polyhydroxy alcohol, in combining proportions.

3. A resinous complex comprising the reaction products of Congo resin, rosin, phthalic anhydride and a polyhydroxy alcohol, in combining proportions.

4. A resinous complex produced from a heat-treated natural resin, an organic carboxylic acid and a polyhydroxy alcohol.

5. A resinous complex produced from a heat-treated Congo resin, phthalic anhydride and a polyhydroxy alcohol.

6. A resinous complex consisting of the reaction products of heat-treated Congo resin and rosin, phthalic anhydride and glycerol.

7. A resinous complex consisting of the reaction complex of Congo resin, an organic carboxylic polybasic acid, and a polyhydroxy alcohol, in combining proportions.

8. A resinous complex produced from a heat-treated natural resin, an organic, polybasic, carboxylic acid, and a polyhydroxy alcohol.

9. A resinous material obtained by reaction of a mixture containing a natural hard resin, a resinifying acid, a polyhydric alcohol and an ether of a polyhydric alcohol.

10. A resinous material obtained by reaction of a mixture containing a cracked natural hard resin, a resinifying acid, a polyhydric alcohol and an ether of a polyhydric alcohol.

CARLETON ELLIS.